United States Patent
Nishikawa et al.

(10) Patent No.: US 11,513,336 B2
(45) Date of Patent: Nov. 29, 2022

(54) PHOSPHOR WHEEL DEVICE, LIGHT SOURCE DEVICE, AND PROJECTION IMAGE DISPLAY DEVICE

(71) Applicant: Panasonic Intellectual Property Management Co., Ltd., Osaka (JP)

(72) Inventors: Yusaku Nishikawa, Osaka (JP); Taiki Bessho, Osaka (JP); Yasuto Shiroi, Osaka (JP); Shigekazu Yamagishi, Osaka (JP); Takashi Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 17/104,417

(22) Filed: Nov. 25, 2020

(65) Prior Publication Data

US 2021/0157126 A1    May 27, 2021

(30) Foreign Application Priority Data

Nov. 27, 2019  (JP) .............................. JP2019-213778

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01); *G03B 21/2013* (2013.01); *G03B 21/2066* (2013.01)

(58) Field of Classification Search
CPC ............ G03B 21/204; G03B 21/00–64; G02B 26/008
See application file for complete search history.

(56) References Cited

U.S. PATENT DOCUMENTS

| | | | | |
|---|---|---|---|---|
| 2016/0266375 A1* | 9/2016 | Li | ......................... | G02B 5/0242 |
| 2017/0227192 A1 | 8/2017 | Ikeda et al. | | |
| 2017/0269461 A1* | 9/2017 | Ikeda | ................... | G02B 26/008 |
| 2019/0369471 A1* | 12/2019 | Mochizuki | ............. | G03B 21/16 |
| 2020/0310236 A1* | 10/2020 | Hsu | ........................ | G03B 33/08 |

FOREIGN PATENT DOCUMENTS

JP    2017-138573    8/2017

* cited by examiner

*Primary Examiner* — Christopher A Lamb, II
(74) *Attorney, Agent, or Firm* — Wenderoth, Lind & Ponack, L.L.P.

(57) ABSTRACT

A phosphor wheel device includes a motor having a rotation shaft, a phosphor wheel substrate attached to one end side of the rotation shaft, and a balancer fixed to the phosphor wheel substrate. The balancer has at least one opening that is open to an outside of the phosphor wheel device.

20 Claims, 10 Drawing Sheets

PHOSPHOR WHEEL DEVICE, LIGHT SOURCE DEVICE, AND PROJECTION IMAGE DISPLAY DEVICE

BACKGROUND

1. Technical Field

The present disclosure relates to a light source device using a phosphor wheel device and a projection image display device using such a light source device.

2. Description of the Related Art

A phosphor wheel device, a light source device using the phosphor wheel device, and a projection image display device are described in, for example, Unexamined Japanese Patent Publication No. 2017-138573.

SUMMARY

The present disclosure provides a phosphor wheel device that enables accurate balance adjustment work to be efficiently performed.

A phosphor wheel device of the present disclosure includes a motor having a rotation shaft, a phosphor wheel substrate attached to one end side of the rotation shaft, and a first balancer fixed to the phosphor wheel substrate. The first balancer has at least one opening that is opened to an outside of the phosphor wheel device.

According to the phosphor wheel device of the present disclosure, when balance of the phosphor wheel device is adjusted, fitting a pin into the opening provided in the balancer can prevent the wheel substrate attached to the rotation shaft of the motor from rotating. Therefore, accurate balance adjustment work can be performed efficiently.

DETAILED DESCRIPTION

Hereinafter, exemplary embodiments for carrying out the present disclosure will be described with reference to the drawings.

First Exemplary Embodiment

Figure 1:
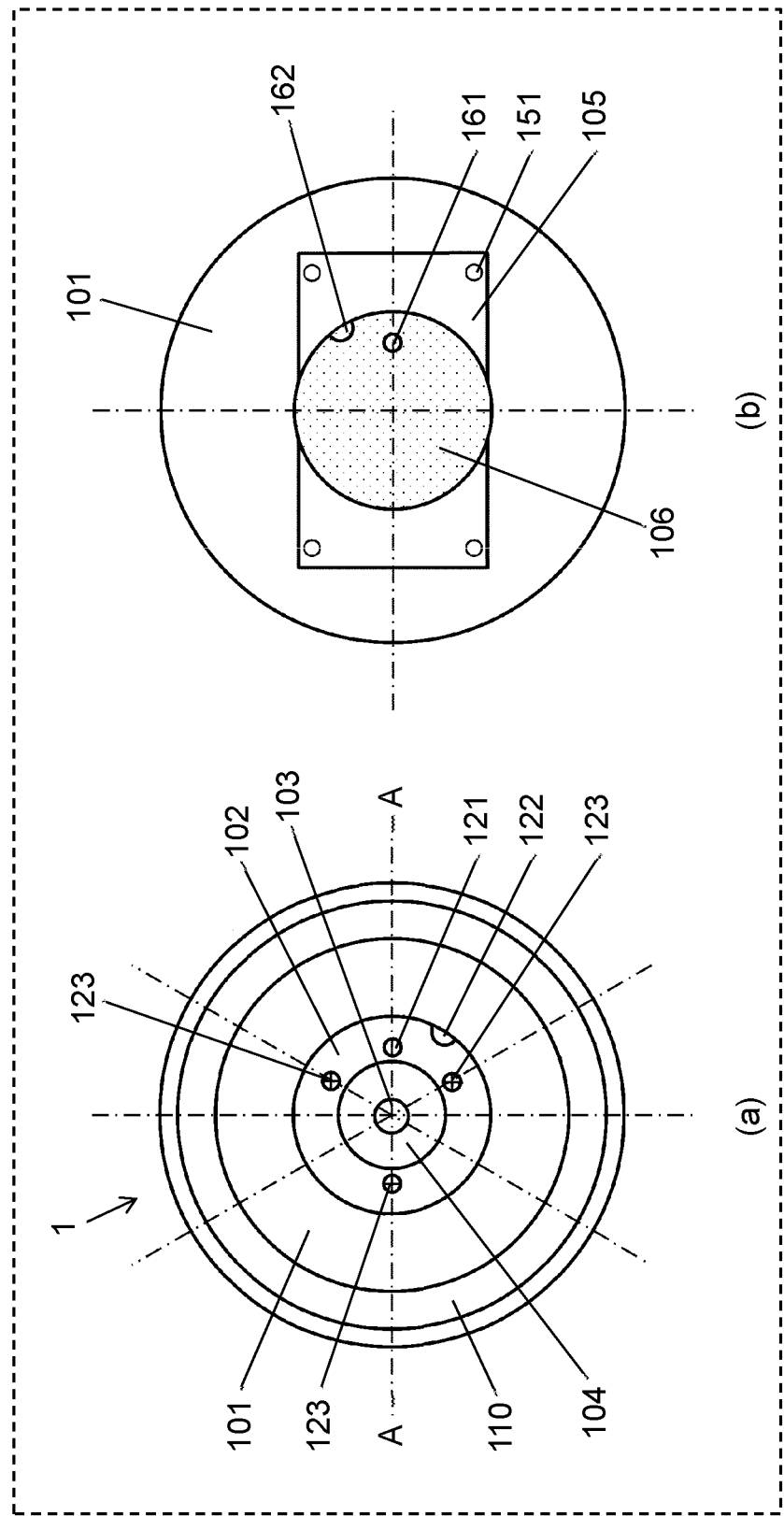
FIG. 1, views (a) and (b), show a configurations of a phosphor wheel device according to a first exemplary embodiment.
Figure 2:
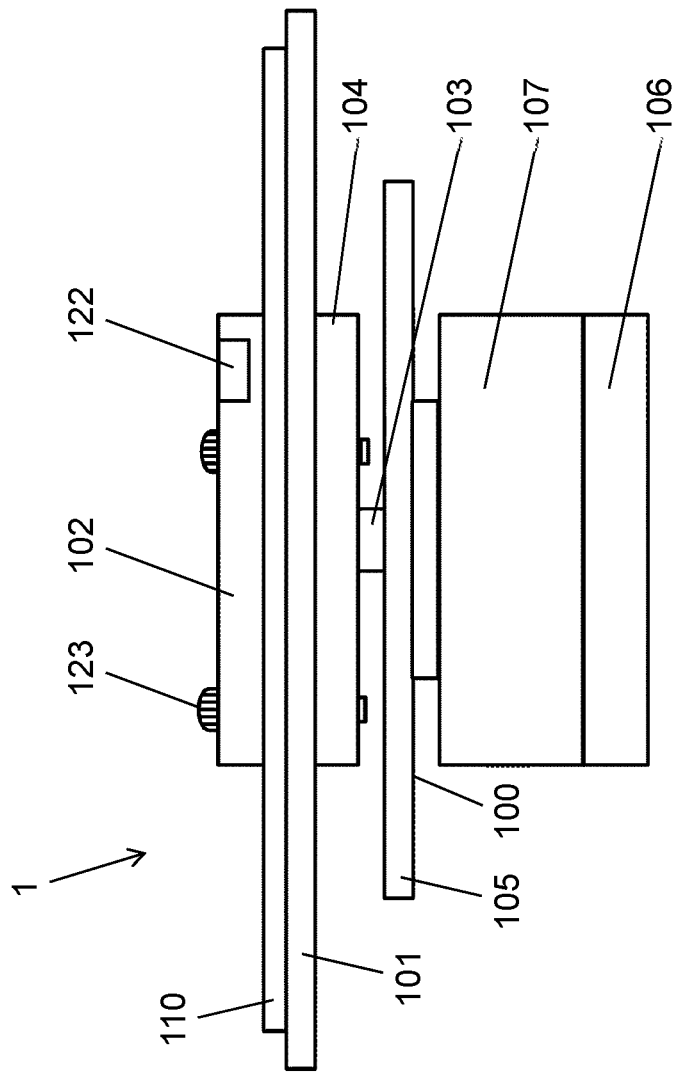
FIG. 2 is a side view of the phosphor wheel device of the first exemplary embodiment.
Figure 3:
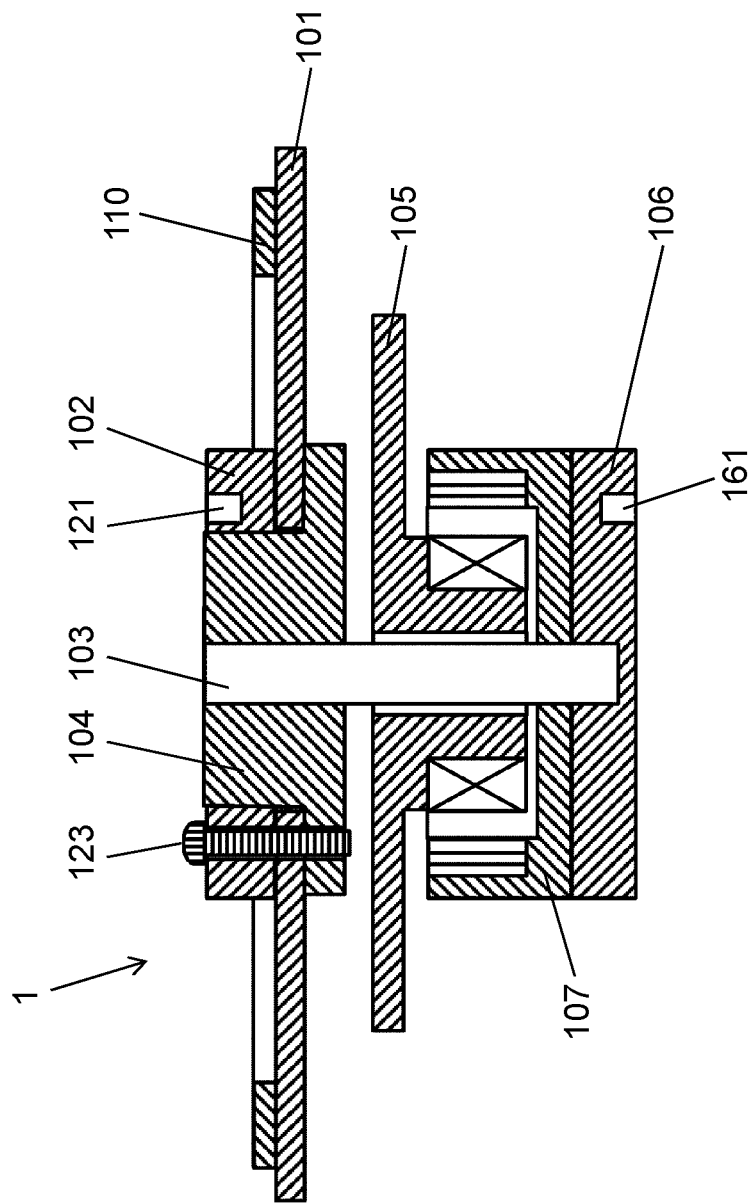
FIG. 3 is a side cross-sectional view of the phosphor wheel device of the first exemplary embodiment.
Figure 4:
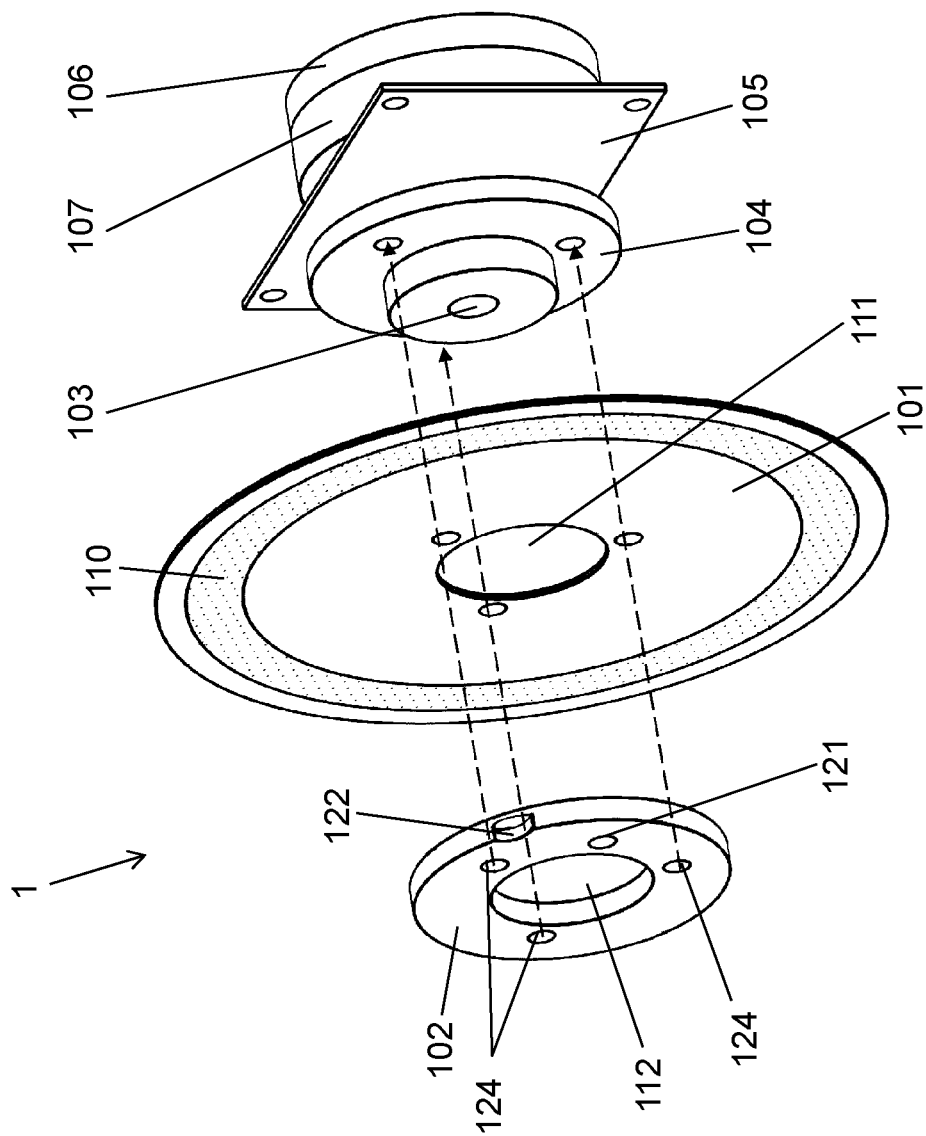
FIG. 4 is an exploded perspective view of a main part of the phosphor wheel device of the first exemplary embodiment.

FIG. 1, views (a) and (b), are configuration views of phosphor wheel device 1 according to a first exemplary embodiment of the present disclosure, view (a) being a plan view of a front surface side, and view (b) being a plan view of a back surface side. FIG. 2 is a side view of the phosphor wheel device according to the first exemplary embodiment, FIG. 3 is a cross-sectional view of a main part in line A-A of FIG. 1, and FIG. 4 is an exploded perspective view of the same.

Phosphor wheel device 1 includes motor 100, disk-shaped phosphor wheel substrate 101, and first balancer 102. Phosphor wheel substrate 101 is attached to one end side of rotation shaft 103 of motor 100 and is made of aluminum. First balancer 102 is located on the one end side of motor 100 and is fixed to phosphor wheel substrate 101. First balancer 102 has a predetermined thickness. Phosphor wheel substrate 101 has phosphor layer 110 provided on a concentric circumference with rotation shaft 103. Phosphor layer 110 is provided on a front surface of phosphor wheel substrate 101 (surface on the one end side of rotation shaft 103 of motor 100). As shown in FIG. 4, phosphor layer 110 has a ring shape. Further, first balancer 102 is disposed inside the ring shape of phosphor layer 110.

Motor 100 includes motor fixing plate 105 including a stator, and rotor 107 attached to another end side of rotation shaft 103. Here, the other end side of rotation shaft 103 is the side opposite to the one end side of rotation shaft 103. Flange 104 is fixed on the one end side of rotation shaft 103, and a cross section of flange 104 has a shape of a projected portion. The projected portion of flange 104 is fitted into hole 111 of phosphor wheel substrate 101, and the projected portion of flange 104 is further fitted into hole 112 of first balancer 102. Further, phosphor wheel substrate 101 is attached to flange 104 by tightening substrate fastening screws 123 through substrate fastening screw holes 124 provided in first balancer 102.

First balancer 102 is formed of brass and has a flat hollow cylindrical shape. First balancer 102 is provided with one rotation prevention hole 121 in which the one end side of rotation shaft 103 is opened. Here, rotation prevention hole 121 is an opening that is opened to an outside of phosphor wheel device 1 as shown in FIG. 3.

Second balancer 106 having a predetermined thickness is attached to the other end side of rotation shaft 103 of motor 100. Second balancer 106 is integrally attached to rotor 107. Second balancer 106 is formed of brass, and has a flat cylindrical shape like first balancer 102. As shown in FIG. 2, an outer diameter of first balancer 102 may be equal to an outer diameter of second balancer 106. Second balancer 106 is provided with one rotation prevention hole 161 in which the other end side of rotation shaft 103 is opened. Here, rotation prevention hole 161 is an opening that is opened to the outside of phosphor wheel device 1 as shown in FIG. 3. That is, as shown in FIG. 3, a direction where rotation prevention hole 121 is opened is opposite to a direction where rotation prevention hole 161 is opened.

Rotation prevention hole 121 of first balancer 102 and rotation prevention hole 161 of second balancer 106 are examples of the respective openings, and their roles will be described later.

Motor 100 is screwed and fixed at a predetermined attachment position by using motor fixing holes 151 provided in motor fixing plate 105. When motor 100 is driven in this state, first balancer 102 and phosphor wheel substrate 101 fixed to flange 104, and rotor 107 to which second balancer 106 is attached rotate about rotation shaft 103.

In a state where phosphor wheel substrate 101 is assembled as phosphor wheel device 1, a centroid position of phosphor wheel substrate 101 does not coincide with a center of rotation shaft 103 in manufacturing. Therefore, when motor 100 is rotated in this state, phosphor wheel substrate 101 rotates while undulating and wobbling in an axial direction in a state where the rotation is not balanced. Phosphor layer 110 is irradiated with excitation light from an excitation light source, but when phosphor wheel substrate 101 wobbles and rotates, vibration becomes large and stable rotation cannot be performed for a long period of time, resulting in inconvenience that reliability cannot be ensured. In addition, if the rotation is not balanced, there is a problem that noise becomes loud. Further, a spot diameter of the excitation light formed on phosphor layer 110 becomes inconstant, which causes inconvenience that fluorescence output becomes inconstant.

Accordingly, it is necessary to adjust a centroid of phosphor wheel substrate 101, and this adjustment can be performed by cutting either or both of first balancer 102 and second balancer 106 with a cutting machine. When, for this balance adjustment, for example, a predetermined position of first balancer 102 is cut with a machining tool, the parts including first balancer 102, which are joined by rotation shaft 103, rotate. This makes it impossible to cut at the predetermined position. Further, when the balance is adjusted by further cutting second balancer 106 after cutting first balancer 102, unnecessary rotation makes it impossible to cut a desired position of second balancer 106.

Figure 5:
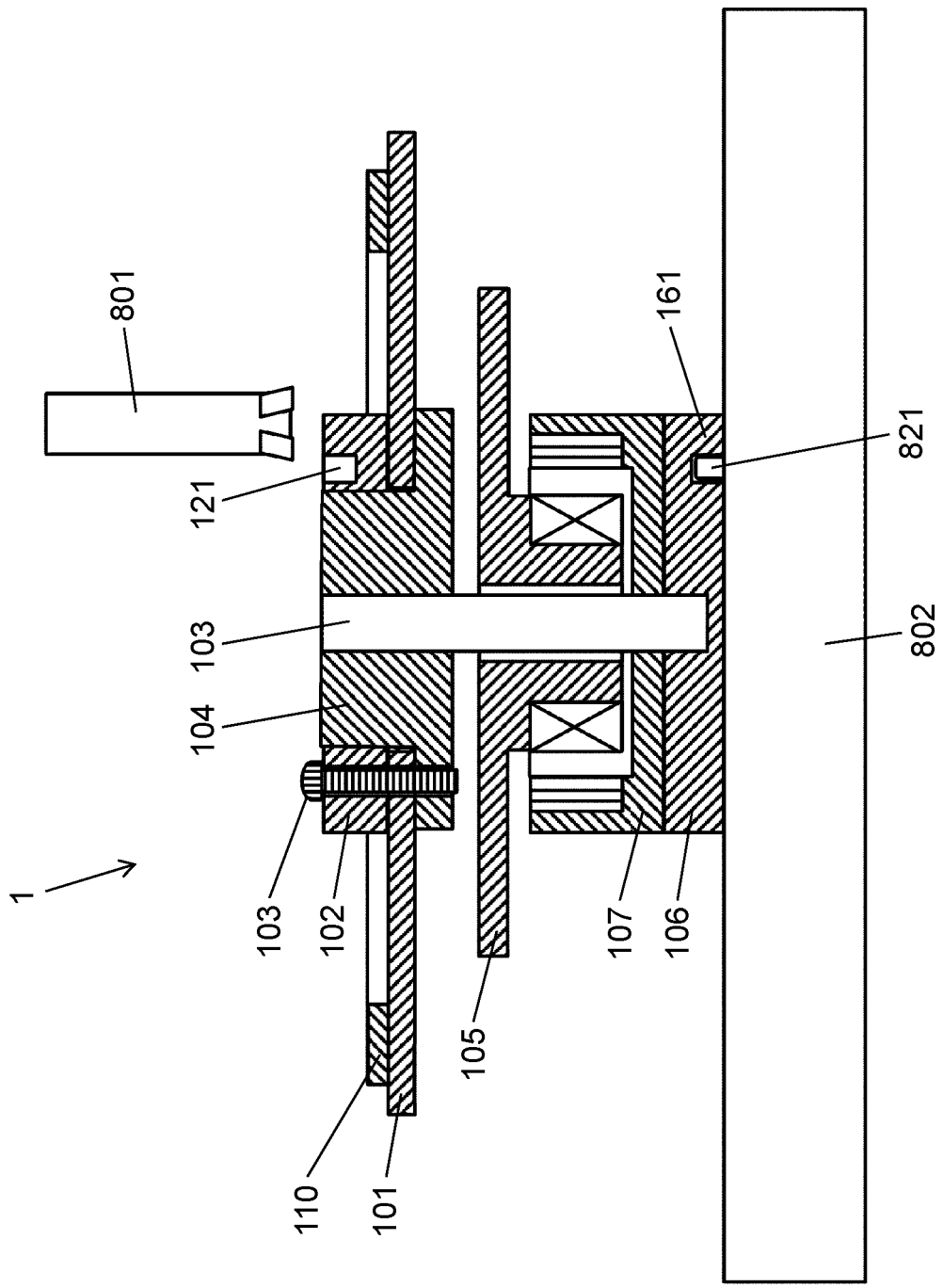
FIG. 5 is a view showing a balancing method in the phosphor wheel device of the first exemplary embodiment.

Consequently, in the present disclosure, as described above, first balancer 102 is provided with rotation prevention hole 121, and second balancer 106 is provided with rotation prevention hole 161. Fixing base 802 for adjustment work is used, fixing based 802 being provided with a pin (that is, rotation prevention protrusion 821) to be fitted into rotation prevention hole 121, 161. Specifically, as shown in FIG. 5, rotation prevention protrusion 821 is fitted into rotation prevention hole 161, phosphor wheel device 1 is placed to be cut with cutting tool for balancing 801, and balancing cutout 122 is formed. By fitting rotation prevention protrusion 821 into rotation prevention hole 161, rotation shaft 103 does not rotate during cutting, and accurate balance adjustment work can be efficiently performed.

Moreover, if it is necessary to adjust the balance by cutting second balancer 106, phosphor wheel device 1 is turned upside down and rotation prevention protrusion 821 is fitted into rotation prevention hole 121 of first balancer 102. Phosphor wheel device 1 is placed on fixing base 802, and is cut with cutting tool for balancing 801, and balancing cutout 162 is created. By fitting rotation prevention protrusion 821 into rotation prevention hole 121, rotation shaft 103 does not rotate during cutting, and accurate balance adjustment work can be efficiently performed.

In the present disclosure, first balancer 102 and second balancer 106 are formed of brass. This allows cutting to be easily performed.

Note that while in the first exemplary embodiment, the rotation prevention openings are rotation prevention holes 121, 161, the openings may be through holes instead. That is, rotation prevention holes 121, 161 may be holes that do not penetrate first and second balancers 102, 106, respectively, or may be through holes that penetrate first and second balancers 102, 106, respectively.

Further, while an example of phosphor wheel substrate 101 is an aluminum plate, it may be, for example, a glass plate, a sapphire glass substrate, or another metal substrate.

Further, while a typical example of a material of first and second balancers 102, 106 is brass, other materials such as aluminum may be used.

Second Exemplary Embodiment

Figure 6:
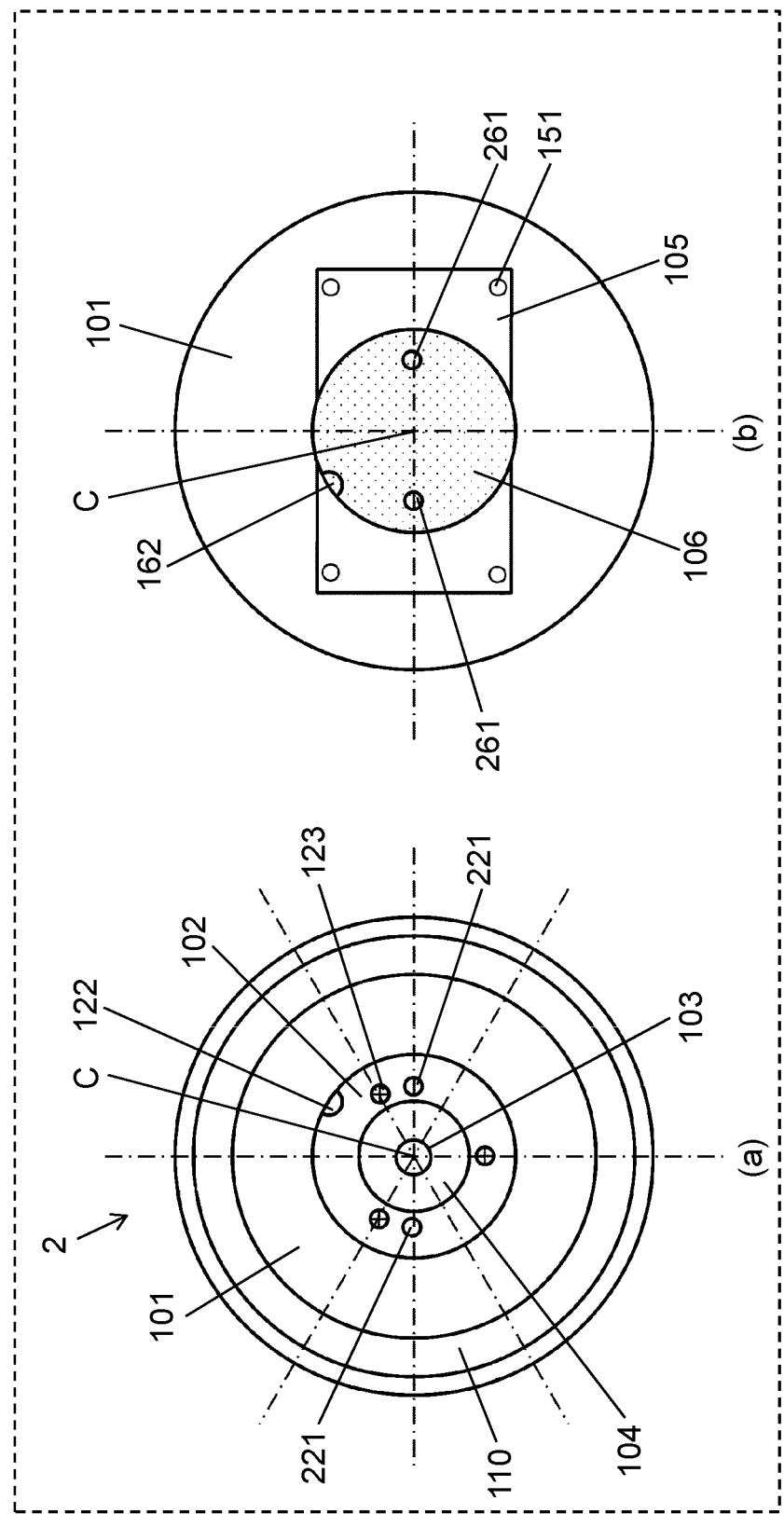
FIG. 6, views (a) and (b), show a configurations of a phosphor wheel device according to a second exemplary embodiment.

FIG. 6, views (a) and (b), are configuration views of phosphor wheel device 2 according to a second exemplary embodiment of the present disclosure, view (a) being a plan view of a front surface side, and view (b) being a plan view of a back surface side.

Here, only points different from the first exemplary embodiment will be described, and in FIG. 6, the same portions as the portions in FIGS. 1 to 5 will be denoted by the same reference signs, and duplicated description will be omitted.

In the second exemplary embodiment, two rotation prevention holes 221 are provided in first balancer 102. These two rotation prevention holes 221 are located on a circumference with rotation shaft 103 of motor 100 as center C, and are disposed at intervals of 180 degrees. In this exemplary embodiment, two rotation prevention holes 261 are provided in second balancer 106. These two rotation prevention holes 261 are located on the circumference with rotation shaft 103 of motor 100 as center C, and are disposed at intervals of 180 degrees.

In this way, first balancer 102 is provided with two rotation prevention holes 221 and second balancer 106 is provided with two rotation prevention holes 261. Therefore, two rotation prevention protrusions 821 of fixing base 802 to be fitted into these holes are also provided.

While in the second exemplary embodiment, the rotation prevention openings are rotation prevention holes 221, 261, through holes may be used instead.

Third Exemplary Embodiment

Figure 7:
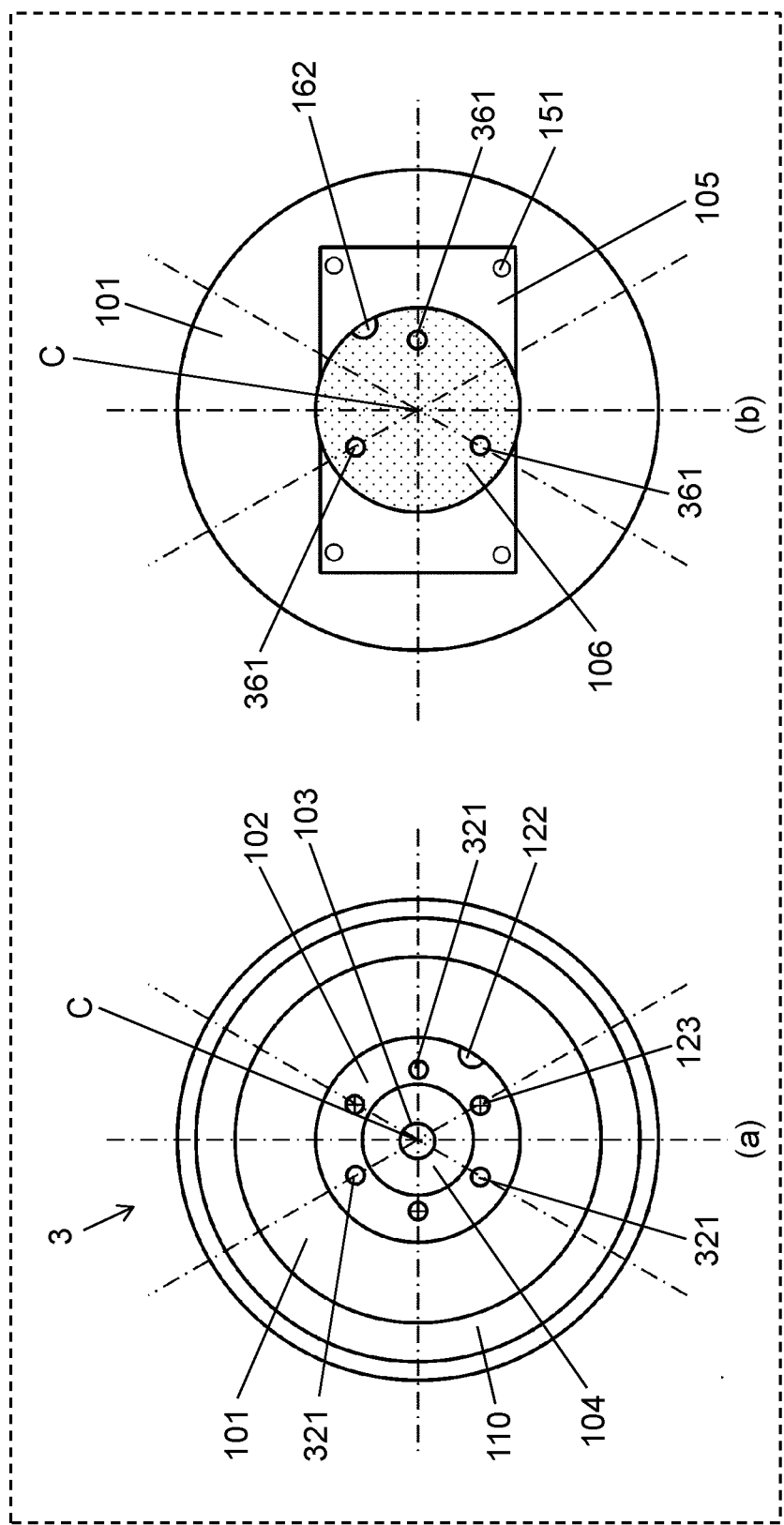
FIG. 7, views (a) and (b), show a configurations of a phosphor wheel device according to a third exemplary embodiment.

FIG. 7, views (a) and (b), are configuration views of phosphor wheel device 3 according to a third exemplary embodiment of the present disclosure, view (a) being a plan view of a front surface side, and view (b) being a plan view of a back surface side.

Here, only points different from the first exemplary embodiment will be described, and in FIG. 7, the same portions as the portions in FIGS. 1 to 5 will be denoted by the same reference signs and duplicated description will be omitted.

In the third exemplary embodiment, three rotation prevention holes 321 are provided in first balancer 102. These three rotation prevention holes 321 are located on a circumference with rotation shaft 103 of motor 100 as center C, and are disposed at intervals of 120 degrees. In this exemplary embodiment, three rotation prevention holes 361 are provided in second balancer 106. These three rotation prevention holes 361 are located on the circumference with rotation shaft 103 of motor 100 as center C, and are disposed at intervals of 120 degrees.

In this way, first balancer 102 is provided with three rotation prevention holes 321 and second balancer 106 is provided with three rotation prevention holes 361. Therefore, three rotation prevention protrusions 821 of fixing base 802 to be fitted into these holes are also provided.

While in the third exemplary embodiment, the rotation prevention openings are rotation prevention holes 321, 361, through holes may be used instead.

Fourth Exemplary Embodiment

Figure 8:
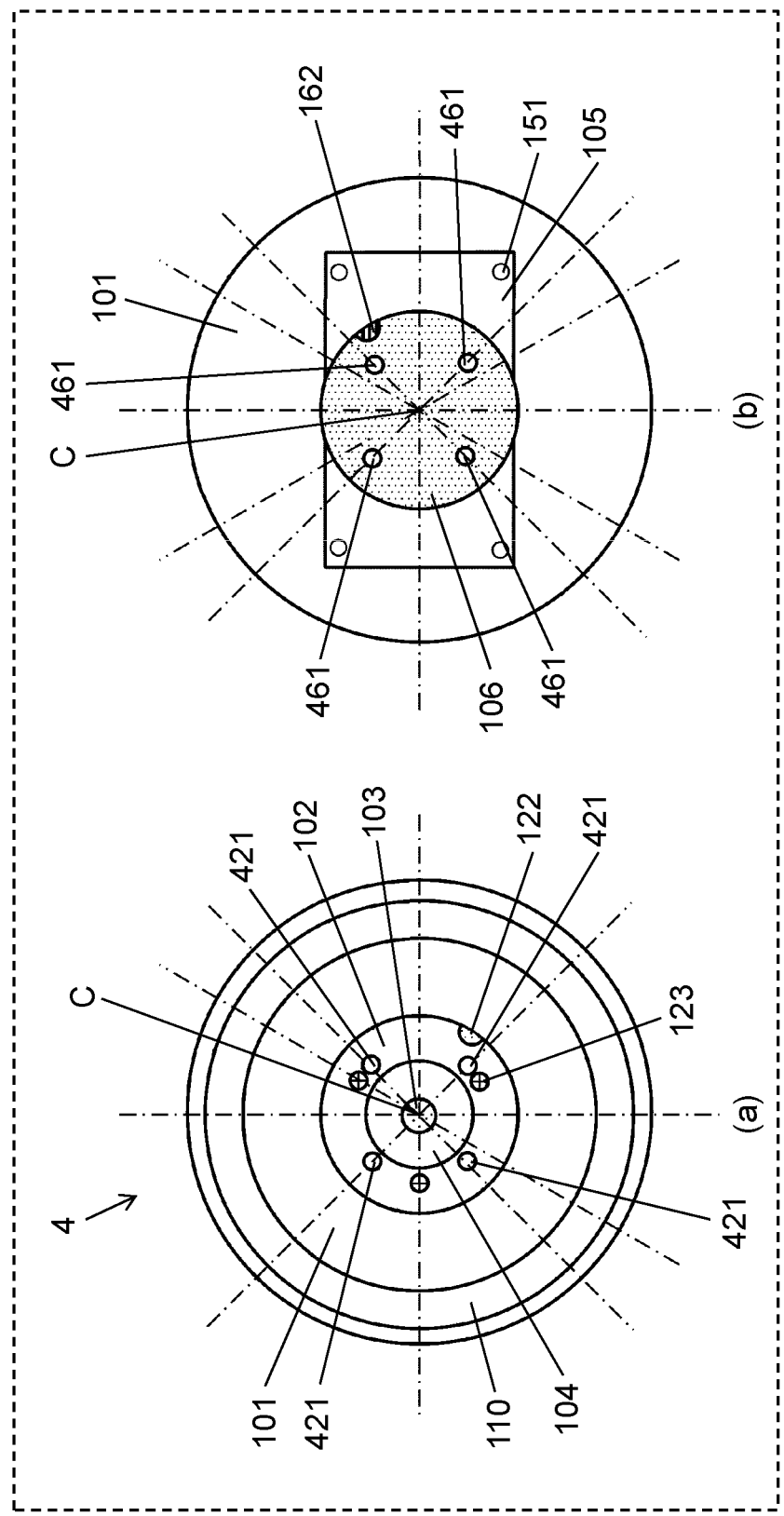
FIG. 8, views (a) and (b), show a configurations of a phosphor wheel device according to a fourth exemplary embodiment.

FIG. 8, views (a) and (b), are configuration views of phosphor wheel device 4 according to a fourth exemplary embodiment of the present disclosure, view (a) being a plan view of a front surface side, and view (b) being a plan view of the back surface side.

Here, only points different from the first exemplary embodiment will be described, and in FIG. 8, the same portions as the portions in FIGS. 1 to 5 will be denoted by the same reference signs and duplicated description will be omitted.

In the fourth exemplary embodiment, four rotation prevention holes 421 are provided in first balancer 102. These four rotation prevention holes 421 are located on a circumference with rotation shaft 103 of motor 100 as center C, and are disposed at intervals of 90 degrees. In this exemplary embodiment, four rotation prevention holes 461 are provided in second balancer 106. These four rotation prevention holes 461 are located on the circumference with rotation shaft 103 of motor 100 as center C, and are disposed at intervals of 90 degrees.

In this way, four rotation prevention holes 421 are provided in first balancer 102, and four rotation prevention holes 461 are provided in second balancer 106. Therefore, four rotation prevention protrusions 821 of fixing base 802 to be fitted into these holes are also provided.

While in the fourth exemplary embodiment, the rotation prevention openings are rotation prevention holes 421, 461, through holes may be used instead.

While examples of different numbers of the rotation prevention holes have been described so far, as long as first and second balancers 102, 106 are configured such that centroids of the rotation prevention holes formed in first and second balancers 102, 106 respectively coincide with the center of rotation, the shape and the number of rotation prevention holes may be different.

Fifth Exemplary Embodiment

[Light Source Device Including Phosphor Wheel Device]

Figure 9:
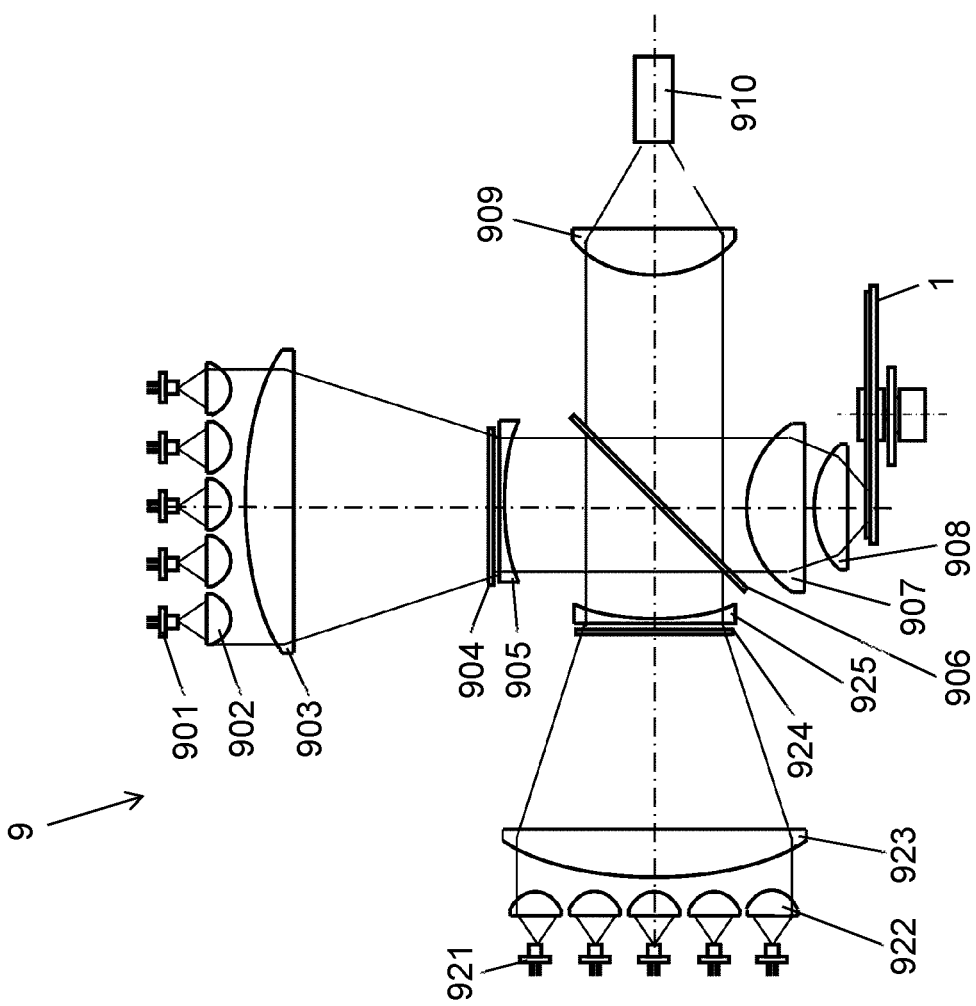
FIG. 9 is a view showing a configuration of a light source device using the phosphor wheel device of the present disclosure.

FIG. 9 is a view showing light source device 9 using the phosphor wheel device of the first exemplary embodiment.

Laser light in a blue wavelength region emitted from a plurality of semiconductor laser light sources 901 is collimated by a plurality of collimator lenses 902 provided corresponding to the respective semiconductor laser light sources 901. The collimated blue light enters convex lens 903 in a subsequent stage to reduce a luminous flux width, and enters subsequent diffuser plate 904 to be diffused, so that light uniformity is improved. The blue light with light uniformity improved enters concave lens 905 in a subsequent stage to be converted into a parallel luminous flux.

The blue light parallelized by concave lens 905 enters color-separating and combining mirror with spectral characteristics 906 disposed at an angle of approximately 45 degrees with respect to an optical axis, and enters convex lens 907 in a subsequent stage as it is without changing a traveling direction of the light. Here, color-separating and combining mirror 906 has a spectral characteristic of passing light in a wavelength region of blue light emitted from semiconductor laser light sources 901 and semiconductor laser light sources 921. Further, color-separating and combining mirror 906 has a spectral characteristic of reflecting light in a wavelength region of fluorescence subjected to wavelength conversion with the blue light emitted from semiconductor laser light sources 901 as the excitation light by phosphor wheel device 1.

Here, it is assumed that color-separating and combining mirror with spectral characteristics 906 has the spectral characteristics focusing on the wavelength characteristics of the blue light from the semiconductor laser light sources and the fluorescence subjected to the wavelength conversion. However, by paying attention to a polarization direction of the semiconductor laser light sources and adjusting the polarization direction of the blue light from the semiconductor laser light sources in the same direction, color-separating and combining mirror with spectral characteristics 906 may have spectral characteristics focusing on a wavelength characteristic of fluorescence resulting from passing the light in the wavelength region of the blue light from the semiconductor laser light sources and in the polarization direction, and subjecting the foregoing passed light to the wavelength conversion.

The blue light that has entered convex lens 907 enters ring-shaped phosphor layer 110 provided in phosphor wheel device 1 in a subsequent stage in combination with convex lens 908 in a subsequent stage. Convex lenses 907, 908 and phosphor wheel device 1 are disposed such that the blue excitation light condensed by convex lenses 907, 908 enters the ring-shaped phosphor layer 110 around rotation shaft 103 of motor 100 of phosphor wheel device 1.

The blue light condensed on phosphor layer 110 of phosphor wheel device 1 by convex lenses 907, 908 is subjected to the wavelength conversion into fluorescence. Further, the blue light changes the traveling direction by 180 degrees and again enters convex lenses 908, 907 in this order to be parallelized. The fluorescence subjected to the wavelength conversion here is combined with the blue light emitted from semiconductor laser light sources 921 described later, and a wavelength region is optimized so as to configure, for example, white light.

The fluorescence parallelized and emitted from convex lens 907 enters, from an opposite direction, color-separating and combining mirror with spectral characteristics 906. As described before, since color-separating and combining mirror with spectral characteristics 906 has the characteristic of reflecting the light in the wavelength region of fluorescence, the direction of the light is changed by 90 degrees.

The fluorescence whose traveling direction of light is changed by 90 degrees by color-separating and combining mirror with spectral characteristics 906 enters convex lens 909 in a subsequent stage.

Further, the laser light in the blue wavelength region emitted from the plurality of semiconductor laser light sources 921 is collimated by a plurality of collimator lenses 922 provided corresponding to respective semiconductor laser light sources 921. The collimated blue light enters convex lens 923 in a subsequent stage to reduce a luminous flux width, and enters subsequent diffuser plate 924 to be diffused, so that the light uniformity is improved. The blue light with light uniformity improved enters concave lens 925 in a subsequent stage to be converted into a parallel luminous flux.

The blue light parallelized by concave lens 925 enters color-separating and combining mirror with spectral characteristics 906, and enters convex lens 909 in the subsequent stage as it is without changing the traveling direction of the light. Here, color-separating and combining mirror 906 has the characteristic of passing the light in the wavelength region of the blue light emitted from semiconductor laser light sources 921, and is disposed at an angle of approximately 45 degrees with respect to an optical axis.

The fluorescence from phosphor wheel device 1 that has entered convex lens 909, and the blue light from semiconductor laser light sources 921 are condensed and enter rod integrator 910 having an incident end disposed at a substantially condensing position of convex lens 909. The light having luminous flux uniformized by rod integrator 910 is emitted from an exit end of rod integrator 910.

In the exemplary embodiment shown in FIG. 9, color-separating and combining mirror with spectral characteristics 906 is disposed at an angle of approximately 45 degrees with respect to the optical axis. However, in order to maximize the spectral characteristics, the angle of the color-separating and combining mirror with spectral characteristics 906 with respect to the optical axis may have an angle different from approximately 45 degrees. In that case, other parts may be disposed in accordance with the angle.

Further, in FIG. 9, it has been described that color-separating and combining mirror with spectral characteristics 906 has the characteristics of transmitting the light in the wavelength region of the blue light and reflecting the light in the wavelength region of fluorescence. However, the disposition of other parts may be optimized as appropriate, assuming that color-separating and combining mirror with spectral characteristics 906 has characteristics of reflecting the light in the wavelength region of the blue light and transmitting the light in the wavelength region of fluorescence.

Further, the laser light from semiconductor laser light sources 901 may be light in an ultraviolet region instead of the light in the wavelength region of blue light. In that case, the characteristics of color-separating and combining mirror with spectral characteristics 906, the disposition of other parts, and the like may be optimized in accordance with a wavelength region of the laser light of semiconductor laser light sources 901.

[Projection Image Display Device Including Light Source Device]

Figure 10:
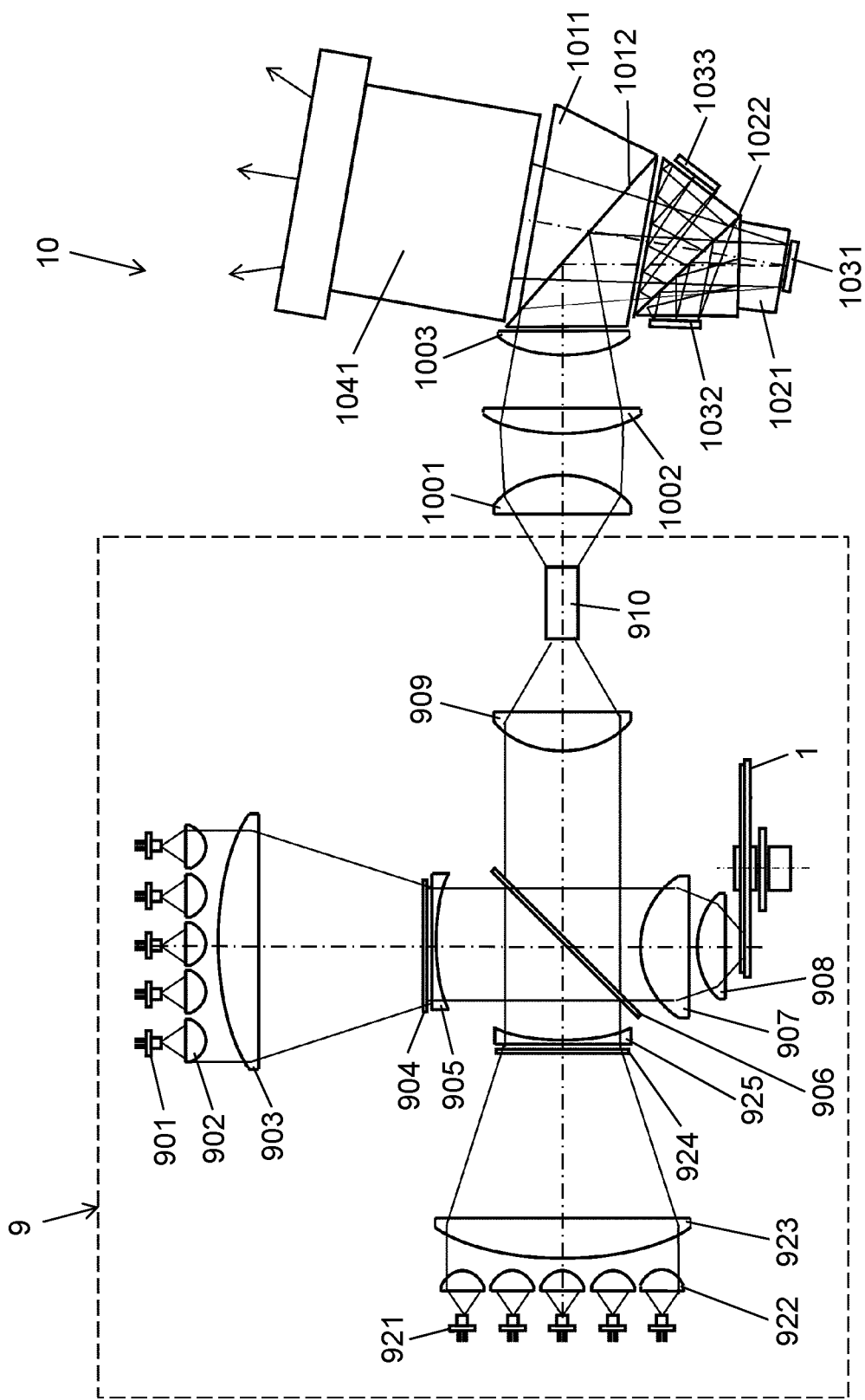
FIG. 10 is a view showing a configuration of a projection image display device using the light source device equipped with the phosphor wheel device of the present disclosure.

A configuration of projection image display device 10 equipped with light source device 9 using phosphor wheel device 1 of the first exemplary embodiment will be described with reference to FIG. 10.

Note that light source device 9 using phosphor wheel device 1 of the first exemplary embodiment is as described above, and thus, description of light source device 9 will be omitted.

Light emitted from rod integrator 910 is mapped to digital micromirror devices (DMDs) 1031, 1032, 1033 through a relay lens system configured of convex lenses 1001, 1002, 1003.

The light emitted from the relay lens system configured of convex lenses 1001, 1002, 1003 enters total reflection prism 1011 provided with minute gap 1012. The light that has been emitted from the relay lens system and has entered total reflection prism 1011 at an angle equal to or greater than a total reflection angle is reflected by minute gap 1012 and changes the traveling direction of the light. The light then enters color prism 1021 configured of three glass blocks provided with minute gap 1022.

The blue light and the fluorescence that have entered a first glass block of color prism 1021 from total reflection prism 1011 are first reflected by a reflective film with a spectral characteristic having a characteristic of blue reflection, the reflective film being provided in a front stage of minute gap 1022. The light then changes the traveling direction, travels toward the total reflection prism, and enters a minute gap provided between total reflection prism 1011 and color prism 1021 at an angle equal to or greater than the total reflection angle. The light then enters DMD 1033 that displays a blue image.

Subsequently, red light of the fluorescent light that has passed through the minute gap changes the traveling direction toward a first glass block side by a reflective film with spectral characteristics. Here, the reflective film with spectral characteristics is provided between second and third glass blocks of color prism 1021, and has spectral characteristics of reflecting light in a red wavelength region and passing green light.

The red light whose traveling direction is changed is reflected again by minute gap 1022 provided between the first and second glass blocks of color prism 1021, and the traveling direction of the light is changed to enter DMD 1032 for red.

Further, at the reflective film with spectral characteristics, green light travels as it is to the third glass block and enters DMD 1031 for green as it is. Here, the reflective film with spectral characteristics is provided between the second and third glass blocks of the color prism, and has the spectral characteristics of reflecting the light in the red wavelength region and passing the green light.

DMDs 1031, 1032, 1033 changes the traveling direction of light by changing a direction of mirror for each pixel in accordance with a video signal of each color from a video circuit (not shown).

First, the green light whose traveling direction is changed in accordance with the video signal by DMD 1031 for green enters the third glass block of color prism 1021 and passes the reflective film with spectral characteristics. Here, the reflective film with spectral characteristics is provided between the third and second glass blocks of color prism 1021.

Subsequently, the red light whose traveling direction is changed in accordance with the video signal by DMD 1032 for red enters the second glass block of color prism 1021. The red light is reflected by entering minute gap 1022 provided between the second and first glass blocks of color prism 1021 at an angle equal to or greater than the total reflection angle. The red light changes the traveling direction of the light toward the third glass block of the color prism, is reflected by the reflective film with spectral characteristics, changes the traveling direction of the light, and is combined with the green light. Here, the reflective film with spectral characteristics is provided between the second and third glass blocks of color prism 1021.

The light combined by the reflective film with spectral characteristics travels toward the first glass block side of color prism 1021 and is transmitted by entering minute gap 1022 at an angle less than or equal to the total reflection angle. Here, minute gap 1022 is provided between the second and first glass blocks of color prism 1021.

Further, the blue light whose traveling direction is changed in accordance with the video signal by the DMD 1033 for blue enters the first glass block of color prism 1021 and travels toward total reflection prism 1011. The blue light then travels toward a second glass block side of color prism 1021 by entering the gap provided between total reflection prism 1011 and color prism 1021 at an angle equal to or greater than the total reflection angle. Thereafter, the blue light is reflected by a mirror with spectral characteristics provided on the first glass block side in front of minute gap 1022 provided between the first and second glass blocks of color prism 1021. The blue light then changes the traveling direction of the light toward total reflection prism 1011, is combined with the light from DMD 1031 for green and DMD 1032 for red, and enters total reflection prism 1011.

The light of DMDs 1031, 1032, 1033 that has entered total reflection prism 1011 is transmitted by entering minute gap 1012 of total reflection prism 1011 at an angle less than or equal to the total reflection angle. The light then enters projection lens 1041 and irradiates a screen (not shown).

The present disclosure is applicable to a light source device including a phosphor wheel device, and a projection image display device using such a light source device.

What is claimed is:

1. A phosphor wheel device comprising:
    a motor having a rotation shaft;
    a phosphor wheel substrate attached to a first end side of the rotation shaft;
    a first balancer fixed to the phosphor wheel substrate; and
    a second balancer attached to a second end side of the rotation shaft,
    wherein:
    each of the first balancer and the second balancer has at least one opening that is open to an outside of the phosphor wheel device;
    the phosphor wheel substrate is between the first balancer and the motor; and
    the motor is between the phosphor wheel substrate and the second balancer.

2. The phosphor wheel device according to claim 1, wherein the at least one opening of the first balancer includes two openings.

3. The phosphor wheel device according to claim 2, wherein the two openings are located on a circumference around the rotation shaft and are disposed at intervals of 180 degrees.

4. The phosphor wheel device according to claim 1, wherein the at least one opening of the first balancer includes three openings.

5. The phosphor wheel device according to claim 4, wherein the three openings are located on a circumference around the rotation shaft and are disposed at intervals of 120 degrees.

6. The phosphor wheel device according to claim 1, wherein the at least one opening of the second balancer includes two openings.

7. The phosphor wheel device according to claim 6, wherein the two openings are located on a circumference around the rotation shaft and are disposed at intervals of 180 degrees.

8. The phosphor wheel device according to claim 1, wherein the at least one opening of the second balancer includes three openings.

9. The phosphor wheel device according to claim 8, wherein the three openings are located on a circumference around the rotation shaft and are disposed at intervals of 120 degrees.

10. The phosphor wheel device according to claim 1, wherein the at least one opening of the first balancer is a through hole penetrating the first balancer.

11. The phosphor wheel device according to claim 1, wherein the at least one opening of the first balancer is a hole that does not penetrate the first balancer.

12. The phosphor wheel device according to claim 11, wherein the at least one opening of the second balancer is a hole that does not penetrate the second balancer.

13. The phosphor wheel device according to claim 1, wherein the first balancer and the second balancer are made of brass.

14. The phosphor wheel device according to claim 1, wherein the phosphor wheel substrate has a phosphor layer on a circumference around the rotation shaft.

15. The phosphor wheel device according to claim 14, wherein:
    the phosphor layer has a ring shape; and
    the first balancer is disposed inside the ring shape of the phosphor layer.

16. The phosphor wheel device according to claim 15, wherein the first balancer has a cylindrical shape.

17. The phosphor wheel device according to claim 16, wherein the second balancer has a cylindrical shape.

18. The phosphor wheel device according to claim 17, wherein an outer diameter of the first balancer is equal to an outer diameter of the second balancer.

19. A light source device comprising:
    the phosphor wheel device according to claim 14; and
    a light source configured to emit light that excites the phosphor layer.

20. A projection image display device comprising the light source device according to claim 19.

* * * * *